United States Patent
Takayama (10) Patent No.: US 10,745,000 B2
(45) Date of Patent: Aug. 18, 2020

(54) HYBRID VEHICLE AND CONTROL METHOD THEREFOR

(71) Applicant: TOYOTA JIDOSHA KABUSHIKI KAISHA, Toyota-shi, Aichi-ken (JP)

(72) Inventor: Daiki Takayama, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 148 days.

(21) Appl. No.: 15/907,524

(22) Filed: Feb. 28, 2018

(65) Prior Publication Data

US 2018/0257640 A1 Sep. 13, 2018

(30) Foreign Application Priority Data

Mar. 7, 2017 (JP) ................... 2017-042719

(51) Int. Cl.
*B60W 20/40* (2016.01)
*B60W 10/115* (2012.01)
(Continued)

(52) U.S. Cl.
CPC ............ *B60W 20/40* (2013.01); *B60W 10/06* (2013.01); *B60W 10/08* (2013.01);
(Continued)

(58) Field of Classification Search
CPC ............ Y02T 10/6286; Y02T 10/6239; Y02T 10/642; Y02T 10/48; Y02T 10/6221; Y02T 10/7005; Y02T 10/7077; Y02T 10/70; Y02T 10/645; Y02T 10/7275; Y02T 10/6226; Y02T 10/6252; Y02T 10/646; Y02T 10/7258; Y02T 10/6295; Y02T 10/7283; Y02T 10/56; Y02T 10/644; Y02T 10/92; Y02T 90/127; B60W 10/06; B60W 10/08; B60W 20/00; B60W 10/02; B60W 20/40; B60W 20/50; B60W 2710/0644; B60W 10/11; B60W 2520/10; B60W 2540/10; B60W 2540/16; B60W 2710/083; B60W 30/18027; B60W 10/10; B60W 10/113; B60W 10/115; B60W 2050/0001;
(Continued)

(56) References Cited

FOREIGN PATENT DOCUMENTS

| JP | 2003176733 A | 6/2003 |
|----|--------------|--------|
| JP | 2013-203116 A | 10/2013 |

(Continued)

OTHER PUBLICATIONS

English translation of JP 2013203116 (Year: 2013).*
English Translation of JP 201611377 (Year: 2016).*

*Primary Examiner* — Tuan C To
*Assistant Examiner* — Paul A Castro
(74) *Attorney, Agent, or Firm* — Sughrue Mion, PLLC (57) ABSTRACT

An engine is controlled such that a first motor rotates at a rotational speed that causes a counter-electromotive voltage of the first motor to be higher than direct current-side voltages of a first inverter and a second inverter, and the first motor outputs torque to a driving shaft through a planetary gear set when an accelerator is on during specified travelling with gates of the first inverter and the second inverter being cut off and an engine being operated. When the accelerator is turned off during the specified traveling, fuel injection of the engine is stopped.

5 Claims, 5 Drawing Sheets

(51) Int. Cl.
 B60W 10/06 (2006.01)
 B60W 10/08 (2006.01)
(52) U.S. Cl.
 CPC ..... B60W 10/115 (2013.01); *B60W 2540/106* (2013.01); *B60W 2710/0616* (2013.01); *B60W 2710/0644* (2013.01); *Y02T 10/6239* (2013.01); *Y02T 10/6286* (2013.01); *Y02T 10/7077* (2013.01); *Y10S 903/905* (2013.01); *Y10S 903/906* (2013.01)
(58) Field of Classification Search
 CPC ......... B60W 2050/0295; B60W 20/10; B60W 20/20; B60W 20/30; B60W 2510/081; B60W 2520/04; B60W 2520/30; B60W 2530/00; B60W 2540/106; B60W 2540/12; B60W 2550/142; B60W 2710/023; B60W 2710/0616; B60W 2710/0666; B60W 2710/081; B60W 2710/1005; B60W 2710/244; B60W 2710/30; B60W 2720/106; B60W 30/18018; B60W 30/18054; B60W 10/26; B60W 2510/0638; B60W 2510/083; B60W 2710/18; B60W 2710/242; B60W 2710/248; B60W 20/15; B60W 30/18127; B60W 20/14; B60W 2510/0657; B60W 10/04; B60W 10/18; B60W 10/24; B60W 2050/0002; B60W 30/188; B60L 50/16; B60L 2240/423; B60L 50/61; B60L 2240/443; B60L 2210/40; B60L 2240/12; B60L 2240/441; B60L 7/18; B60L 2250/26; B60L 7/26; B60L 15/2018; B60L 2210/30; B60L 2210/44; B60L 2240/427; B60L 2240/547; B60L 50/15; B60L 7/14; B60L 3/003; B60L 3/0046; B60L 15/007; B60L 15/20; B60L 15/2009; B60L 15/2045; B60L 2210/42
 See application file for complete search history.

(56) References Cited

FOREIGN PATENT DOCUMENTS

| | | | | |
|---|---|---|---|---|
| JP | 2013203116 A | * | 10/2013 | ......... Y02T 10/6239 |
| JP | 2014-100959 A | | 6/2014 | |
| JP | 2016113977 A | * | 6/2016 | ......... Y02T 10/6239 |
| WO | 2014/076563 A1 | | 5/2014 | |

* cited by examiner

HYBRID VEHICLE AND CONTROL METHOD THEREFOR

CROSS-REFERENCE TO RELATED APPLICATIONS

The disclosure of Japanese Patent Application No. 2017-042719 filed on Mar. 7, 2017 including the specification, drawings and abstract is incorporated herein by reference in its entirety.

BACKGROUND

1. Technical Field

The present disclosure relates to a hybrid vehicle and a control method therefor.

2. Description of Related Art

As a hybrid vehicle of this type, there has been proposed a vehicle including an engine, a first motor, a planetary gear mechanism including a carrier, a sun gear, and a ring gear that are connected to the engine, the first motor, and an output member coupled with driving wheels. The hybrid vehicle also includes a second motor connected to the output member, an inverter that drives the first motor and the second motor, and a battery connected to the inverter through an electric power line (see, for example, Japanese Patent Application Publication No. 2013-203116). When an accelerator of the hybrid vehicle is on while the hybrid vehicle travels with a gate of the inverter being cut off and the engine being operated, the hybrid vehicle controls the engine based on a direct current-side voltage of the inverter, rotational speed of the output member, and an accelerator operation amount so that a counter-electromotive voltage generated with rotation of the first motor becomes higher than the direct current-side voltage of the inverter. With such control, the hybrid vehicle regulates braking torque based on the counter-electromotive voltage of the first motor, and regulates counterforce torque (driving torque generated in the output member) of the braking torque.

SUMMARY

When the accelerator is on while the hybrid vehicle travels with the gate of the inverter being cut off and the engine being operated, the hybrid vehicle travels with operation (fuel injection) of the engine. When the accelerator is turned off in this state, and the engine rotational speed is lowered while fuel injection of the engine is continued, the rotational speed of the engine and the first motor gradually decreases. As a result, it may take a longer time until the braking torque of the first motor and by extension the driving torque of the output member become sufficiently small. This may prolong the time until deceleration of the hybrid vehicle becomes large to some extent.

Accordingly, in view of the circumstances, there is provided a hybrid vehicle and a control method therefor that shorten the time until driving torque of a driving shaft becomes sufficiently small when an accelerator is turned off while the hybrid vehicle travels with gate of inverters being cut off and an engine being operated.

According to one aspect of the present disclosure, there is provided a hybrid vehicle including an engine, a first motor, a second motor, a planetary gear set, a first inverter, a second inverter, an electric storage device, and an electronic control unit. The first motor is configured to generate a counter-electromotive voltage with rotation of the first motor. The second motor is connected to a driving shaft coupled with driving wheels of the hybrid vehicle. The planetary gear set includes three rotation elements connected to three shafts, the shafts including a shaft of the first motor, a shaft of the engine, and the driving shaft, the rotation elements being connected such that the first motor, the engine, and the driving shaft are arrayed in the order of the first motor, the engine, and the driving shaft in an alignment chart. The first inverter is configured to drive the first motor. The second inverter is configured to drive the second motor. The electric storage device is connected to the first inverter and the second inverter through an electric power line. The electronic control unit is configured to: (i) control the engine such that the first motor rotates at a rotational speed that causes the counter-electromotive voltage of the first motor to be higher than direct current-side voltages of the first inverter and the second inverter, and the first motor outputs torque to the driving shaft through the planetary gear set, when an accelerator is on during specified traveling of the hybrid vehicle with gates of the first inverter and the second inverter being cut off and the engine being operated; and (ii) stop fuel injection of the engine, when the accelerator is turned off during the specified traveling with the gates of the first inverter and the second inverter being cut off and the engine being operated.

The hybrid vehicle as described in the foregoing controls the engine such that the first motor rotates at a rotational speed that causes the counter-electromotive voltage of the first motor to be higher than the direct current-side voltages of the first inverter and the second inverter, and the first motor outputs torque to the driving shaft through the planetary gear set, when the accelerator is on during specified traveling with the gates of the first inverter and the second inverter being cut off and the engine being operated. When the first motor rotates, a drag torque (mechanical loss) is generated in the first motor. When the counter-electromotive voltage of the first motor is higher than the direct current-side voltage of the first inverter, a regeneration torque based on the counter-electromotive voltage is also generated in addition to the drag torque in the first motor. Therefore, the hybrid vehicle can travel with the driving torque of the driving shaft based on the regeneration torque and the drag torque in the first motor, when the counter-electromotive voltage of the first motor is made higher than the direct current-side voltage of the first inverter. When the accelerator is turned off during the specified traveling, fuel injection of the engine is stopped. As a consequence, the engine (first motor) rotational speed can quickly be decreased as compared with the case where fuel injection of the engine is continued. This makes it possible to shorten the time until the counter-electromotive voltage of the first motor reaches the direct current-side voltage of the first inverter or below, that is, the time until generation of the regeneration torque stops in the first motor, or the time until the drag torque of the first motor becomes sufficiently small. Therefore, the time until the driving torque of the driving shaft becomes sufficiently small can be shortened. As a result, it becomes possible to shorten the time until deceleration of the hybrid vehicle becomes large to some extent.

In the hybrid vehicle of the present disclosure, the electronic control unit may be configured to resume fuel injection of the engine when the engine rotational speed reaches a specified rotational speed or below, or when the accelerator is turned on, after the accelerator is turned off during the specified traveling and fuel injection of the engine is stopped.

The hybrid vehicle as described before can suppress excessive decrease in the engine rotational speed when the accelerator is kept off. When the accelerator is turned on, the hybrid vehicle can resume regulation of the first motor (engine) rotational speed so as to resume traveling with the driving torque of the driving shaft based on the regeneration torque and the drag torque in the first motor.

According to another aspect of the present disclosure, there is provided a control method for a hybrid vehicle, the hybrid vehicle including an engine, a first motor, a second motor, a planetary gear set, a first inverter, a second inverter, an electric storage device, and an electronic control unit. Here, the first motor is configured to generate a counter-electromotive voltage with rotation of the first motor. The second motor is connected to a driving shaft coupled with driving wheels of the hybrid vehicle. The planetary gear set includes three rotation elements connected to three shafts, the shafts including a shaft of the first motor, a shaft of the engine, and the driving shaft, the rotation elements being connected such that the first motor, the engine, and the driving shaft are arrayed in the order of the first motor, the engine, and the driving shaft in an alignment chart. The first inverter is configured to drive the first motor. The second inverter is configured to drive the second motor. The control method includes the following. That is, (i) the engine is controlled such that the first motor rotates at a rotational speed that causes the counter-electromotive voltage of the first motor to be higher than direct current-side voltages of the first inverter and the second inverter, and the first motor outputs torque to the driving shaft through the planetary gear set, when an accelerator is on during specified traveling with gates of the first inverter and the second inverter being cut off and the engine being operated. (ii) Fuel injection of the engine is stopped, when the accelerator is turned off during the specified traveling with the gates of the first inverter and the second inverter being cut off and the engine being operated.

According to the control method for the hybrid vehicle as described in the foregoing, the hybrid vehicle can travel with the driving torque of the driving shaft based on a regeneration torque and a drag torque in the first motor, when the counter-electromotive voltage of the first motor is made higher than the direct current-side voltage of the first inverter. When the accelerator is turned off during the specified traveling, fuel injection of the engine is stopped. As a consequence, the engine (first motor) rotational speed can quickly be decreased as compared with the case where fuel injection of the engine is continued. This makes it possible to shorten the time until the counter-electromotive voltage of the first motor reaches the direct current-side voltage of the first inverter or below, that is, the time until generation of the regeneration torque stops in the first motor, or the time until the drag torque of the first motor becomes sufficiently small. Therefore, the time until the driving torque of the driving shaft becomes sufficiently small can be shortened. As a result, it becomes possible to shorten the time until deceleration of the hybrid vehicle becomes large to some extent.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
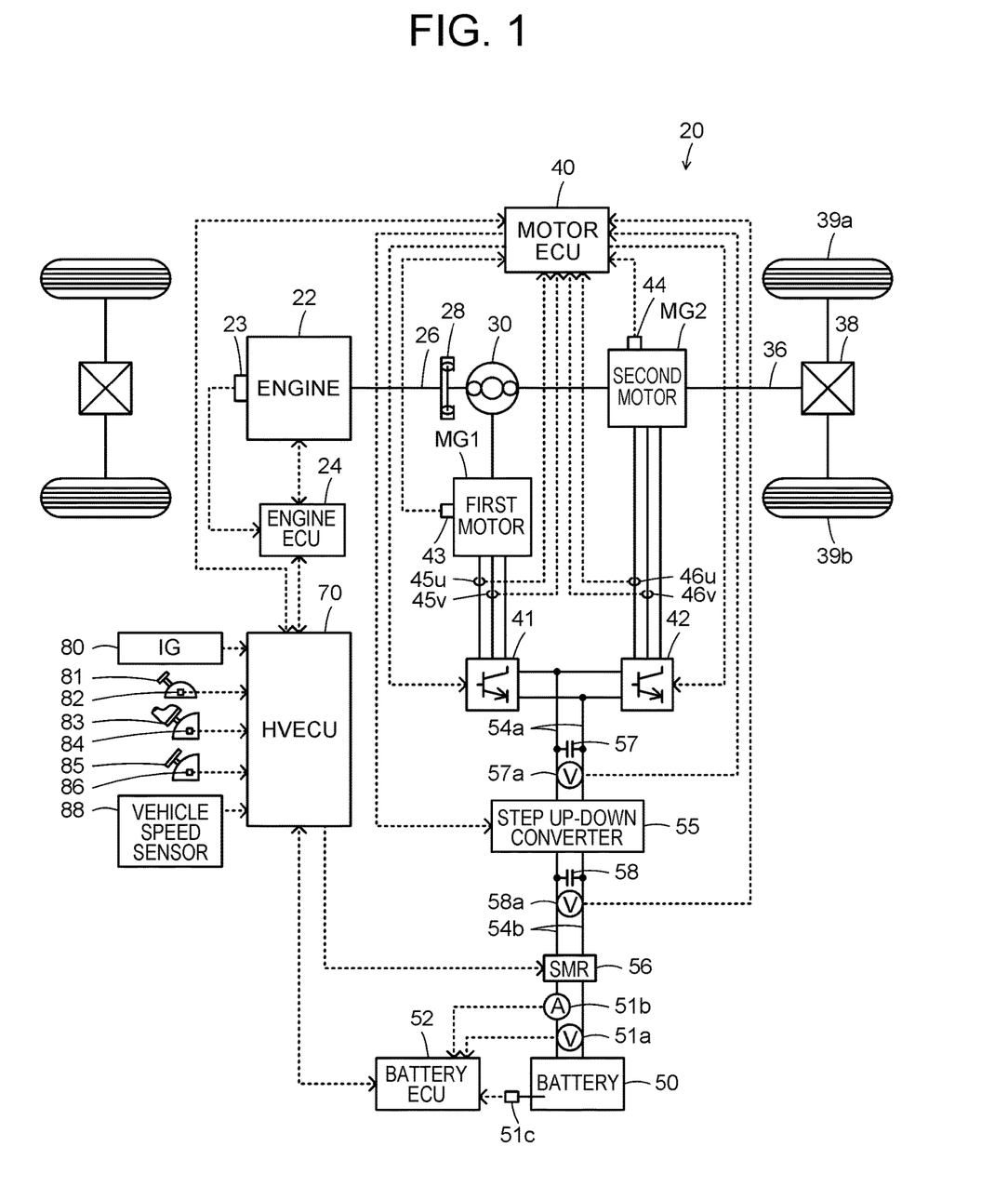
FIG. 1 is a block diagram illustrating an outlined configuration of a hybrid vehicle as one embodiment of the present disclosure.
Figure 2:
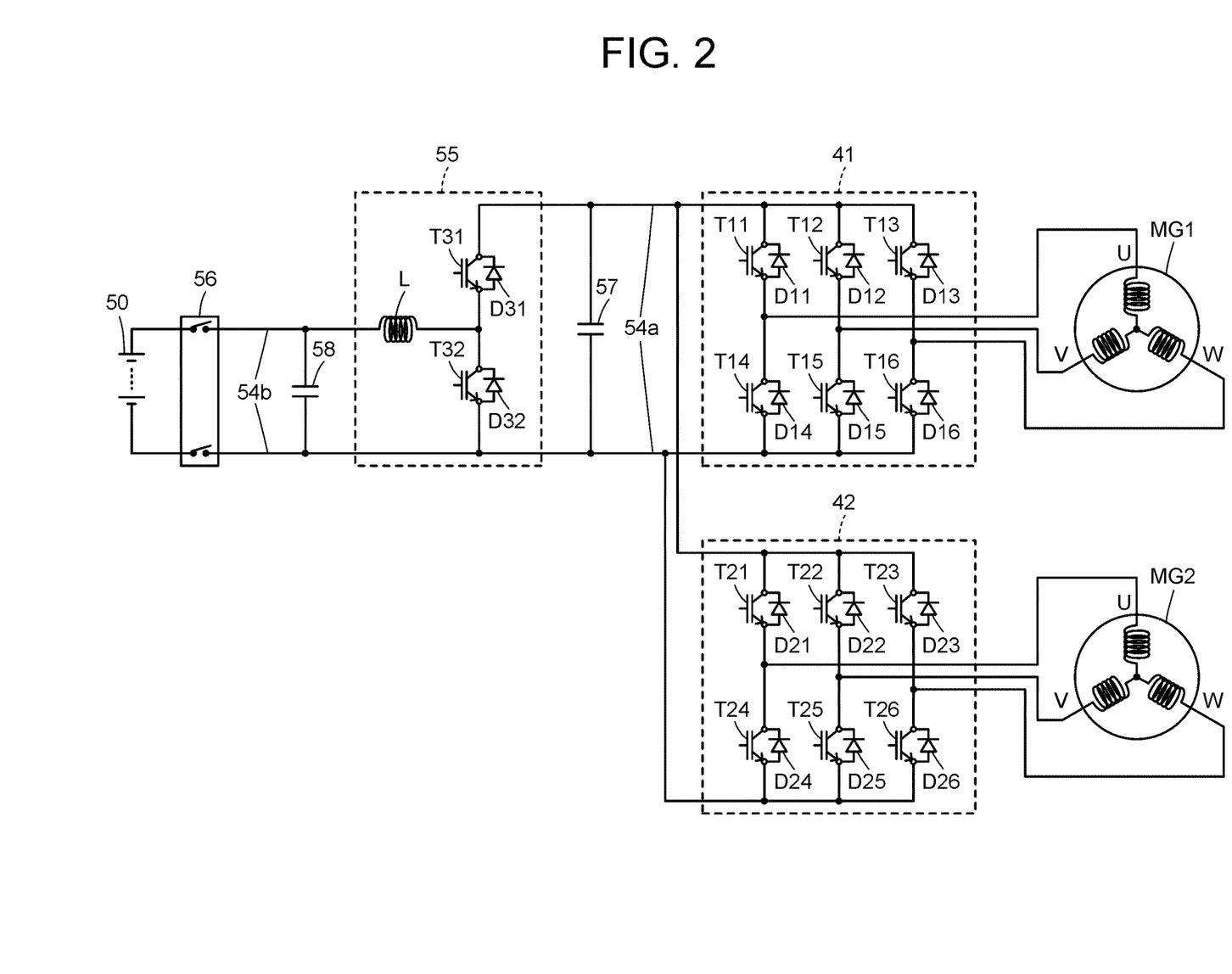
FIG. 2 is a block diagram illustrating an outlined configuration of an electric drive system including a first motor and a second motor.

Now, modes for carrying out the present disclosure will be described in detail based on embodiments. FIG. 1 is a block diagram illustrating an outlined configuration of a hybrid vehicle 20 as one embodiment of the present disclosure. FIG. 2 is a block diagram illustrating an outlined configuration of an electric drive system including a first motor MG1 and a second motor MG2. The hybrid vehicle 20 of the embodiment includes, as illustrated in the drawing, an engine 22, a planetary gear set 30, the first motor MG1, the second motor MG2, a first inverter 41, a second inverter 42, a step up-down converter 55, a battery 50 as an electric storage device, a system main relay 56, and a hybrid electronic control unit (hereinafter referred to as "HVECU") 70.

The engine 22 is configured as an internal combustion engine that outputs motive power by using fuel, such as gasoline, and gas oil. The operation of the engine 22 is controlled by an engine electronic control unit (hereinafter referred to as "engine ECU") 24.

Although not illustrated, the engine ECU 24 is configured as a microprocessor having a CPU as a main component. The engine ECU 24 includes, in addition to the CPU, a ROM that stores processing programs, a RAM that temporarily stores data, input and output ports, and a communication port. The engine ECU 24 receives, through the input port, input of signals from various sensors necessary for operation control of the engine 22, the signals including, for example, a crank angle θcr from a crank position sensor 23 that detects a rotational position of a crankshaft 26 of the engine 22. The engine ECU 24 outputs various control signals for operation control of the engine 22 through the output port. The engine ECU 24 is connected with the HVECU 70 through the communication port. The engine ECU 24 calculates a rotational speed Ne of the engine 22 based on the crank angle θcr from the crank position sensor 23.

The planetary gear set 30 is configured as a single pinion-type planetary gear mechanism. The planetary gear set 30 has a sun gear connected to a rotator of the first motor MG1. The planetary gear set 30 has a ring gear connected to a driving shaft 36 coupled with driving wheels 39a, 39b through a differential gear set 38. The planetary gear set 30 has a carrier connected to the crankshaft 26 of the engine 22 through a damper 28.

The first motor MG1 is configured as a synchronous generator-motor including a rotator with a permanent magnet embedded therein and a stator with a three-phase coil wound therearound. As described before, the rotator is connected to the sun gear of the planetary gear set 30. The second motor MG2 is configured as a synchronous generator-motor as in the case of the first motor MG1. The second motor MG2 has a rotator connected to the driving shaft 36.

The first inverter 41 and the second inverter 42 are used for driving of the first motor MG1 and the second motor MG2. As illustrated in FIG. 2, the first inverter 41 is connected to a high voltage-side electric power line 54a. The first inverter 41 has six transistors T11 to T16, and six diodes D11 to D16 that are connected in parallel with the six transistors T11 to T16, respectively. The transistors T11 to T16 are disposed in pairs so that their source side and sink side are connected to a positive electrode-side line and a negative electrode-side line of the high voltage-side electric power line 54a, respectively. Junction points between the pairs made from the transistors T11 to T16 are connected to coils of a three-phase coil (U-phase, V-phase, W-phase) of the first motor MG1, respectively. Therefore, when voltage acts on the first inverter 41, a motor electronic control unit (hereinafter referred to as "motor ECU") 40 regulates a ratio of turn-on time of the pairs of the transistors T11 to T16. As a result, a rotating field is formed in the three-phase coil, so that the first motor MG1 is rotationally driven. Like the first inverter 41, the second inverter 42 is connected to the high voltage-side electric power line 54a. The second inverter 42 also has six transistors T21 to T26 and six diodes D21 to D26. When voltage acts on the second inverter 42, the motor ECU regulates a ratio of turn-on time of the pairs of the transistors T21 to T26. As a result, a rotating field is formed in the three-phase coil, so that the second motor MG2 is rotationally driven.

The step up-down converter 55 is connected to the high voltage-side electric power line 54a and a low voltage-side electric power line 54b. The step up-down converter 55 has two transistors T31, T32, two diodes D31, D32 that are connected in parallel to the transistors T31, T32, and a reactor L. The transistor T31 is connected to the positive electrode-side line of the high voltage-side electric power line 54a. The transistor T32 is connected to the transistor T31, the negative electrode-side line of the high voltage-side electric power line 54a, and a negative electrode-side line of the low voltage-side electric power line 54b. The reactor L is connected to a junction point between the transistor T31 and the transistor T32 and to a positive electrode-side line of the low voltage-side electric power line 54b. As a ratio of turn-on time of the transistors T31, T32 is regulated by the motor ECU 40, the first step up-down converter 55 steps up the voltage of electric power of the low voltage-side electric power line 54b and supplies the electric power to the high voltage-side electric power line 54a, or steps down the voltage of electric power of the high voltage-side electric power line 54a and supplies the electric power to the low voltage-side electric power line 54b. The positive electrode-side line and the negative electrode-side line of the high voltage-side electric power line 54a are equipped with a smoothing capacitor 57. The positive electrode-side line and the negative electrode-side line of the low voltage-side electric power line 54b are equipped with a smoothing capacitor 58.

Although not illustrated, the motor ECU 40 is configured as a microprocessor having a CPU as a main component. The motor ECU 40 includes, in addition to the CPU, a ROM that stores processing programs, a RAM that temporarily stores data, input and output ports, and a communication port. As illustrated in FIG. 1, the motor ECU 40 receives input of signals from various sensors necessary for drive control of the first motor MG1, the second motor MG2, and the step up-down converter 55 through the input port. Examples of the signals input into the motor ECU 40 may include rotational positions θm1, θm2 from a first rotational position detection sensor 43 and a second rotational position detection sensor 44 that detect rotational positions of the rotators of the first motor MG1 and the second motor MG2, and phase currents Iu1, Iv1, Iu2, Iv2 from current sensors 45u, 45v, 46u, 46v that detect electric current flowing in respective phases of the first motor MG1 and the second motor MG2. The examples of the signals may also include a voltage (high voltage-side voltage) VH of the capacitor 57 (high voltage-side electric power line 54a) from a voltage sensor 57a attached across the terminals of the capacitor 57, and a voltage (low voltage-side voltage) VL of the capacitor 58 (low voltage-side electric power line 54b) from a voltage sensor 58a attached across the terminals of the capacitor 58. The motor ECU 40 outputs through the output port various control signals for performing drive control of the first motor MG1, the second motor MG2, and the step up-down converter 55. Examples of the signals output from the motor ECU 40 may include switching control signals to the transistors T11 to T16 of the first inverter 41 and to the transistors T21 to T26 of the second inverter 42, and switching control signals to the transistors T31, T32 of the step up-down converter 55. The motor ECU 40 is connected with the HVECU 70 through the communication port. The motor ECU 40 calculates electrical angles θe1, θe2, angular speeds ωm1, ωm2, and rotational speeds Nm1, Nm2 of the first motor MG1 and the second motor MG2 based on the rotational positions θm1, θm2 of the rotators of the first motor MG1 and the second MG2 from the first rotational position detection sensor 43 and the second rotational position detection sensor 44.

For example, the battery 50 is configured as a lithium-ion secondary battery or a nickel-hydrogen secondary battery. The battery 50 is connected to the low voltage-side electric power line 54b. The battery 50 is managed by a battery electronic control unit (hereinafter referred to as "battery ECU") 52.

Although not illustrated, the battery ECU 52 is configured as a microprocessor having a CPU as a main component. The battery ECU 52 includes, in addition to the CPU, a ROM that stores processing programs, a RAM that temporarily stores data, input and output ports, and a communication port. The battery ECU 52 receives through the input port input of signals from various sensors necessary for managing the battery 50. Examples of the signals input into the battery ECU 52 may include a voltage Vb of the battery 50 from a voltage sensor 51a attached across the terminals of the battery 50, a current Ib of the battery 50 from a current sensor 51b attached to an output terminal of the battery 50, and a temperature Tb of the battery 50 from a temperature sensor 51c attached to the battery 50. The battery ECU 52 is connected with the HVECU 70 through the communication port. The battery ECU 52 calculates a state of charge SOC based on an integrated value of the electric current Ib of the battery 50 from the current sensor 51b. The state of charge SOC refers to a ratio of capacity of electric power dischargeable from the battery 50 to the total capacity of the battery 50.

The system main relay 56 is provided in a portion of the low voltage-side electric power line 54b closer to the battery 50 side than the capacitor 58. The system main relay 56 connects and disconnects between the battery 50 and the step up-down converter 55 when on-off control of the system main relay SMR is performed by the HVECU 70.

Although not illustrated, the HVECU 70 is configured as a microprocessor having a CPU as a main component. The HVECU 70 includes, in addition to the CPU, a ROM that stores processing programs, a RAM that temporarily stores data, input and output ports, and a communication port. The HVECU 70 receives signals from various sensors through the input port. Examples of the signals input into the HVECU 70 may include an ignition signal from an ignition switch 80, and a shift position SP from a shift position sensor 82 that detects an operative position of a shift lever 81. The examples of the signals may also include an accelerator operation amount Acc from an accelerator pedal position sensor 84 that detects a stepping-in amount of an accelerator pedal 83, a brake pedal position BP from a brake pedal position sensor 86 that detects the stepping-in amount of the brake pedal 85, and a vehicle speed V from a vehicle speed sensor 88. The shift position SP includes a parking position (P position), a reversing position (R position), a neutral position (N position), and a driving position (D position). As described before, the HVECU 70 is connected with the engine ECU 24, the motor ECU 40, and the battery ECU 52 through the communication port.

The thus-configured hybrid vehicle 20 of the embodiment sets a request driving force of the driving shaft 36 based on the accelerator operation amount Acc and the vehicle speed V, and performs operation control of the engine 22, the first motor MG1, and the second motor MG2 such that a request motive power corresponding to the request driving force is output to the driving shaft 36. Operation modes of the engine 22, the first motor MG1, and the second motor MG2 may include modes (1) to (3) stated below. Both (1) torque conversion operation mode and (2) charging and discharging operation mode are the modes for controlling the engine 22, the first motor MG1, and the second motor MG2 such that the request motive power is output to the driving shaft 36 with operation of the engine 22. Since there is no substantial difference in control between the mode (1) and the mode (2), they are collectively referred to as an engine operation mode. (1) Torque conversion operation mode: a mode for performing operation control of the engine 22 such that the motive power corresponding to the request motive power is output from the engine 22 and for performing drive control of the first motor MG1 and the second motor MG2 such that all the motive power output from the engine 22 is converted to torque by the planetary gear set 30, the first motor MG1, and the second motor MG2 and that the request motive power is output to the driving shaft 36. (2) Charging and discharging operation mode: a mode for performing operation control of the engine 22 such that the motive power corresponding to a sum of the request motive power and electric power necessary for charging and discharging of the battery 50 is output from the engine 22, and for performing drive control of the first motor MG1 and the second motor MG2 such that all or some of the motive power output from the engine 22 is converted to torque by the planetary gear set 30, the first motor MG1, and the second motor MG2 while charging and discharging of the battery 50 is conducted and that the request motive power is output to the driving shaft 36. (3) Motor operation mode: a mode for performing drive control of the second motor MG2 such that operation of the engine 22 is stopped and the request motive power is output to the driving shaft 36.

The hybrid vehicle 20 of the embodiment performs inverter-less traveling (limp home) with gates of the first inverter 41 and the second inverter 42 being cut off (all the transistors T11 to T16, T21 to T26 being turned off) and the engine 22 being operated, when abnormality occurs in the first inverter 41, the second inverter 42, or in the sensors (such as the first rotational position detection sensor 43, and the second rotational position detection sensor 44) used for control of the first inverter 41 and the second inverter 42 during operation (rotation) of the engine 22.

Figure 3:
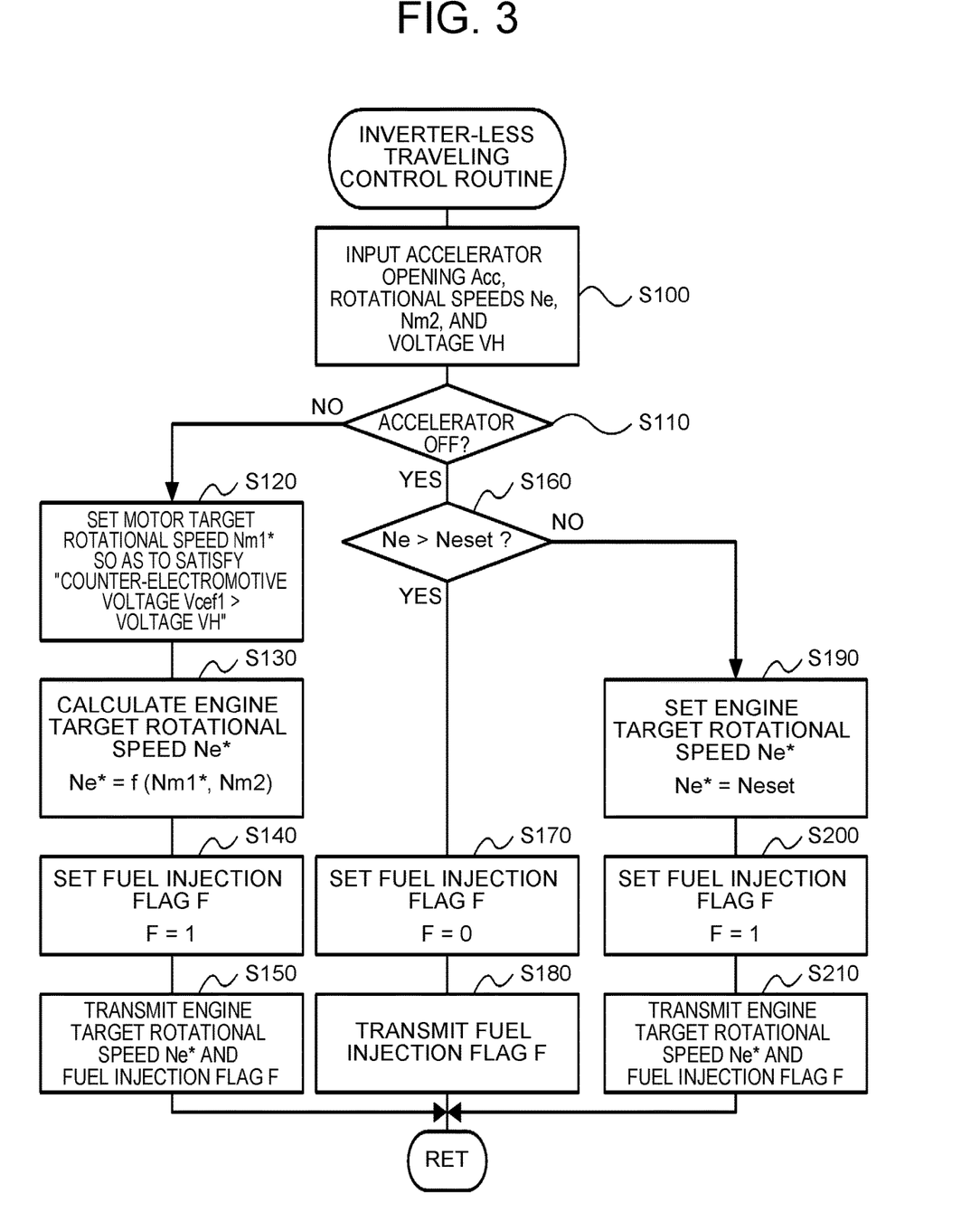
FIG. 3 is a flowchart illustrating one example of an inverter-less traveling control routine executed by a hybrid electronic control unit of an embodiment.

A description is now given of operation of the hybrid vehicle 20 of the embodiment configured in this way, and the operation at the time of performing inverter-less traveling in particular. FIG. 3 is a flowchart illustrating one example of an inverter-less traveling control routine executed by the HVECU 70 in the embodiment. The routine is repeatedly executed in inverter-less traveling. In the embodiment, when the hybrid vehicle performs inverter-less traveling, the HVECU 70 sets a target voltage VH* of the high voltage-side electric power line 54a to a specified voltage VHset, and transmits the target voltage VH* to the motor ECU 40 in parallel to the present routine. When receiving the target voltage VH* of the high voltage-side electric power line 54a, the motor ECU 40 performs switching control of the transistors T31, T32 of the step up-down converter 55 such that the voltage VH of the high voltage-side electric power line 54a becomes the target voltage VH*. As the specified voltage VHset, values such as 330V, 350V, and 370V may be used, for example.

When the inverter-less traveling control routine of FIG. 3 is executed, the HVECU 70 inputs data such as the accelerator operation amount Acc, the rotational speed Ne of the engine 22, the rotational speed Nm2 of the second motor MG2, and the voltage VH of the high voltage-side electric power line 54a (capacitor 57) (step S100). Here, the accelerator operation amount Acc to be input is a value detected by the accelerator pedal position sensor 84. As the rotational speed Ne of the engine 22, a value calculated based on the crank angle $\theta cr$ of the engine 22 detected by the crank position sensor 23 is input from the engine ECU 24 through communication. As the rotational speed Nm2 of the second motor MG2, a value calculated based on the rotational position $\theta m2$ of the rotor of the second motor MG2 detected by the second rotational position detection sensor 44 is input from the motor ECU 40 through communication, or a value obtained by multiplying the vehicle speed V detected by the vehicle speed sensor 88 by a conversion coefficient is input. As the voltage VH of the high voltage-side electric power line 54a, a value detected by the voltage sensor 57a is input from the motor ECU 40 through communication.

Once the data is input in this way, the HVECU 70 determines whether the accelerator is on or off based on the input accelerator operation amount Acc (step S110). When the accelerator is on, the HVECU 70 sets a target rotational speed Nm1* of the first motor MG1 to a specified rotational speed Nm1set such that a counter-electromotive voltage Vcef1 generated with rotation of the first motor MG1 becomes higher than the voltage VH of the high voltage-side electric power line 54a (step S120). Here, the counter-electromotive voltage Vcef1 of the first motor MG1 corresponds to a product of an angular speed $\omega m1$ and a counter-electromotive voltage constant Km1 of the motor MG1. As the specified rotational speed Nm1set, values such as 4000 rpm, 5000 rpm, and 6000 rpm may be used, for example.

Figure 4:
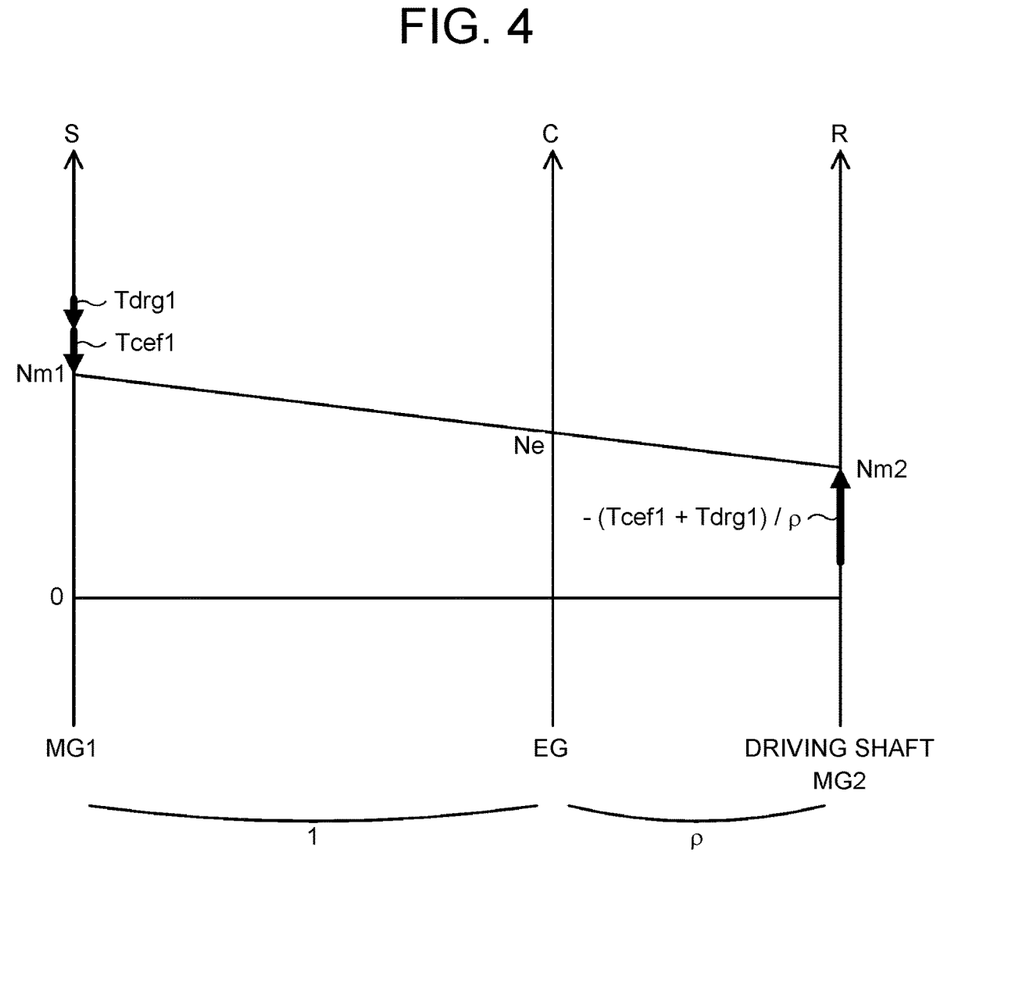
FIG. 4 is an explanatory view illustrating one example of an alignment chart of a planetary gear set when a counter-electromotive voltage of the first motor is higher than the voltage of a high voltage-side electric power line while the gates of a first inverter and a second inverter illustrated in FIG. 1 are cut off.

FIG. 4 is an explanatory view illustrating one example of an alignment chart of the planetary gear set 30 when the counter-electromotive voltage Vcef1 of the first motor MG1 is higher than the voltage VH of the high voltage-side electric power line 54a while the gates of the first inverter 41 and the second inverter 42 are cut off. In FIG. 4, a left S-axis represents rotational speed of the sun gear of the planetary gear set 30 that is the rotational speed Nm1 of the first motor MG1, a C-axis represents rotational speed of the carrier of the planetary gear set 30 that is the rotational speed Ne of the engine 22, and an R-axis represents rotational speed of the ring gear of the planetary gear set 30 that is the rotational speed Nm2 of the second motor MG2 (and a rotational speed Nd of the driving shaft 36). In FIG. 4, a value "ρ" represents a gear ratio (the number of teeth of the sun gear/the number of teeth of the ring gear) of the planetary gear set 30. As illustrated in FIG. 4, when the first motor MG1 rotates, a drag torque (mechanical loss) Tdrg1 is generated in the first motor MG1. When the counter-electromotive voltage Vcef1 of the first motor MG1 is higher than the voltage VH of the high voltage-side electric power line 54a, the drag torque Tdrg1, as well as a regeneration torque Tcef1 based on the counter-electromotive voltage Vcef1 is generated in the first motor MG1. Accordingly, when the counter-electromotive voltage Vcef1 of the first motor MG1 is higher than the voltage VH of the high voltage-side electric power line 54a, a counterforce torque of the regeneration torque Tcef1 and the drag torque Tdrg1 of the first motor MG1 (−(Tdrg1+ Tcef1)/ρ) is output to the driving shaft 36 as a driving torque (torque for forward travel). An absolute value of the drag torque Tdrg1 of the first motor MG1 becomes larger as an absolute value of the rotational speed Nm1 of the first motor MG1 is larger. More specifically, the regeneration torque Tcef1 of the first motor MG1 is generated as the first motor MG1 is rotated with operation of the engine 22, and the electric power based on the counter-electromotive voltage Vcef1 of the first motor MG1 is rectified by the diode D11 to D16 of the first inverter 41 and is supplied to the battery 50 through the high voltage-side electric power line 54a, the step up-down converter 55, and the low voltage-side electric power line 54b.

Once the target rotational speed Nm1* of the first motor MG1 is set in this way, the HVECU 70 calculates a target rotational speed Ne* of the engine 22 by Expression (1) with use of the target rotational speed Nm1* of the first motor MG1, the rotational speed Nm2 (rotational speed Nd of the driving shaft 36) of the second motor MG2, and the gear ratio ρ of the planetary gear set 30 (step S130). The HVECU 70 then sets a fuel injection flag F of the engine 22 to a value "1" (step S140), transmits the target rotational speed Ne* of the engine 22 and the fuel injection flag F to the engine ECU 24 (step S150), and ends the present routine. Here, Expression (1) can easily be derived with reference to FIG. 4. When receiving the target rotational speed Ne* of the engine 22 and the fuel injection flag F set to the value "1", the engine ECU 24 performs intake air amount control, fuel injection control, and ignition control of the engine 22 so that the rotational speed Ne of the engine 22 becomes the target rotational speed Ne*. When the fuel injection flag F is switched from the value "0" to the value "1" during control of the engine 22, the engine ECU 24 starts (restarts) fuel injection of the engine 22. When the fuel injection flag F is switched from the value "1" to the value "0", the engine ECU 24 stops fuel injection of the engine 22. When the accelerator is in the turned-on state, the rotational speed Ne of the engine 22 is basically larger than a later-described specified rotational speed Neset.

$$Ne^* = (Nm1^* \times \rho + Nm2)/(1+\rho) \quad (1)$$

Thus, the counter-electromotive voltage Vcef1 of the first motor MG1 is made higher than the voltage VH of the high voltage-side electric power line 54a when the accelerator is in the turned-on state. As a result, the hybrid vehicle 20 can travel with the driving torque of the driving shaft 36 based on the regeneration torque Tcef1 and the drag torque Tdrg1 of the first motor MG1.

When the accelerator is in the turned-on state in step S110, the HVECU 70 compares the rotational speed Ne of the engine 22 with the specified rotational speed Neset (step S160). When the rotational speed Ne of the engine 22 is larger than the specified rotational speed Neset, the HVECU 70 sets the fuel injection flag F to the value "0" (step S170), transmits the fuel injection flag F to the engine ECU 24 (step S180), and ends the present routine. Here, the specified rotational speed Neset may be set to values slightly larger than an allowable lower limit rotational speed Nemin as a lower limit of a rotational speed range where self-sustained operation of the engine 22 is possible. For example, the specified rotational speed Neset may be rotational speeds larger by 200 rpm, 300 rpm, and 400 rpm than the allowable lower limit rotational speed Nemin of the engine 22.

As described in the foregoing, when the accelerator is on, the rotational speed Ne of the engine 22 is basically larger than the specified rotational speed Neset. Accordingly, when the accelerator is turned off, the fuel injection of the engine 22 is stopped. When the fuel injection of the engine 22 is stopped, the rotational speed Ne of the engine 22 (rotational speed Nm1 of the first motor MG1) can quickly be decreased as compared the case where fuel injection of the engine 22 is continued. This makes it possible to shorten the time until the counter-electromotive voltage Vcef1 of the first motor MG1 becomes equal to or above the voltage VH of the high voltage-side electric power line 54a, that is, the time until generation of the regeneration torque Tcef1 stops in the first motor MG1, or the time until the drag torque Tdrg1 of the first motor MG1 becomes sufficiently small. Therefore, the time until the driving torque of the driving shaft 36 becomes sufficiently small can be shortened. As a result, it becomes possible to shorten the time until deceleration of the hybrid vehicle becomes large to some extent.

When the rotational speed Ne of the engine 22 is equal to or less than the specified rotational speed Neset in step S160, the HVECU 70 sets the target rotational speed Ne* of the engine 22 to the specified rotational speed Neset (step S190). The HVECU 70 also sets the fuel injection flag F to the value "1" (step S200), transmits the target rotational speed Ne* of the engine 22 and the fuel injection flag F to the engine ECU 24 (step S210), and ends the present routine.

Therefore, when the rotational speed Ne of the engine 22 reaches the specified rotational speed Neset or below after the accelerator is turned off and fuel injection of the engine 22 stops, fuel injection of the engine 22 is resumed. This makes it possible to suppress the situation where the rotational speed Ne of the engine 22 excessively decreases (the rotational speed Ne of the engine 22 becomes lower than the allowable lower limit rotational speed Nemin). As a result, when the accelerator is turned on again, the hybrid vehicle can resume regulation of the rotational speed Ne of the first motor MG1 (engine 22) so as to resume traveling with the driving torque of the driving shaft 36 based on the regeneration torque Tcef1 and the drag torque Tdrg1 of the first motor MG1.

Figure 5:
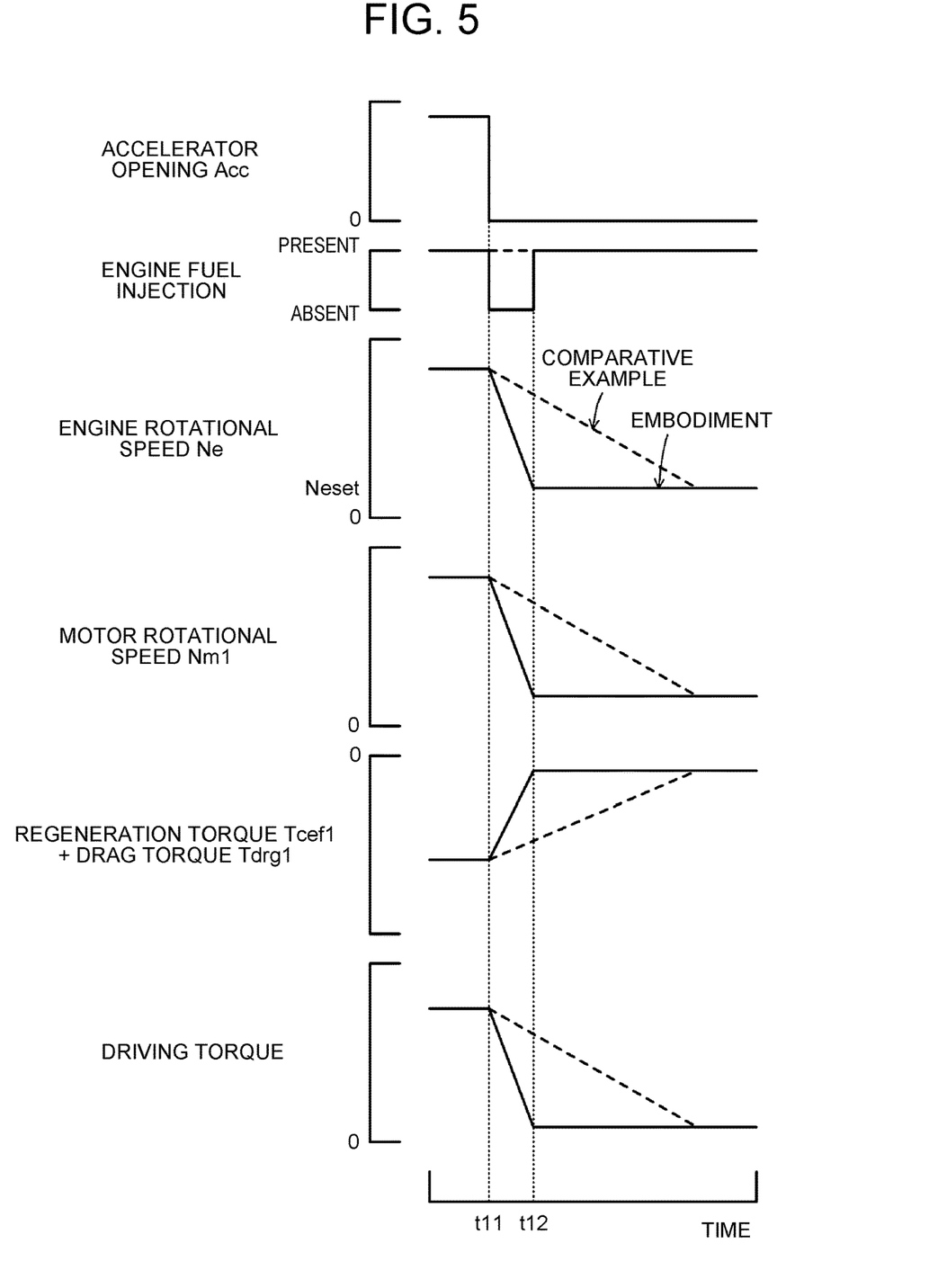
FIG. 5 is an explanatory view illustrating one example of the situation when an accelerator of the hybrid vehicle is turned off during inverter-less traveling.

FIG. 5 is an explanatory view illustrating one example of the situation when an accelerator is turned off during inverter-less traveling. FIG. 5 illustrates presence or absence of the fuel injection of the engine 22, the rotational speed Ne of the engine 22, the rotational speed Nm1 of the first motor MG1, a sum of the regeneration torque Tcef1 and the drag torque Tdrg1 of the first motor MG1 (Tcef1+Tdrg1), and the driving torque of the driving shaft 36 in the embodiment with solid lines, and those in a comparative example with broken lines. The comparative example is configured such that fuel injection of the engine 22 continues even when the accelerator is turned off. As illustrated in the drawing, when the accelerator is turned off (time t11), the rotational speed Ne of the engine 22 and the rotational speed Nm1 of the first motor MG1 decrease more quickly in the embodiment where the fuel injection of the engine 22 stops than in the comparative example where fuel injection of the engine 22 continues. This makes it possible to shorten the time until the counter-electromotive voltage Vcef1 of the first motor MG1 becomes equal to or below the voltage VH of the high voltage-side electric power line 54a, that is, the time until generation of the regeneration torque Tcef1 stops in the first motor MG1, or the time until the drag torque Tdrg1 of the first motor MG1 becomes sufficiently small. Therefore, the time until the driving torque of the driving shaft 36 becomes sufficiently small can be shortened. As a result, it becomes possible to shorten the time until deceleration of the hybrid vehicle becomes large to some extent. In the embodiment, when the rotational speed Ne of the engine 22 reaches the threshold Neset (time t12) or below, the HVECU 70 resumes fuel injection of the engine 22 and controls the engine 22 such that the rotational speed Ne of the engine 22 becomes the specified rotational speed Neset. This makes it possible to suppress the situation where the rotational speed Ne of the engine 22 excessively decreases (the rotational speed Ne of the engine 22 becomes lower than the allowable lower limit rotational speed Nemin). As a result, when the accelerator is turned on again, the hybrid vehicle can resume regulation of the rotational speed Ne of the first motor MG1 (engine 22) so as to resume traveling with the driving torque of the driving shaft 36 based on the regeneration torque Tcef1 and the drag torque Tdrg1 of the first motor MG1.

In the hybrid vehicle 20 of the embodiment described in the foregoing, when the accelerator is on during inverter-less traveling, the engine 22 (and step up-down converter 55) is controlled such that the first motor MG1 rotates at a rotational speed that causes the counter-electromotive voltage Vcef1 of the first motor MG1 to be higher than the voltage VH of the high voltage-side electric power line 54a, and that the driving torque based on the regeneration torque Tcef1 and the drag torque Tdrg1 of the first motor MG1 is output to the driving shaft 36. When the accelerator is turned off during the inverter-less traveling, fuel injection of the engine 22 is stopped. This makes it possible to shorten the time until the counter-electromotive voltage Vcef1 of the first motor MG1 becomes equal to or below the voltage VH of the high voltage-side electric power line 54a, that is, the time until generation of the regeneration torque Tcef1 stops in the first motor MG1, or the time until the drag torque Tdrg1 of the first motor MG1 becomes sufficiently small. Therefore, the time until the driving torque of the driving shaft 36 becomes sufficiently small can be shortened. As a result, it becomes possible to shorten the time until deceleration of the hybrid vehicle becomes large to some extent.

In the hybrid vehicle 20 of embodiment, when the accelerator is on during the inverter-less traveling, the target voltage VH* of the high voltage-side electric power line 54a is set to the specified voltage VHset, and the target rotational speed Nm1* of the first motor MG1 is set to the specified rotational speed Nm1 set. However, the target rotational speed Nm1* of the first motor MG1 and the target voltage VH* of the high voltage-side electric power line 54a may be set such that absolute values of the regeneration torque Tcef1 and the drag torque Tdrg1 of the first motor MG1 and by extension an absolute value of the driving torque of the driving shaft 36 increase more as the accelerator operation amount Acc is larger. In this case, it may be considered to set the target rotational speed Nm1* of the first motor MG1 to a rotational speed that tends to increase more as the accelerator operation amount Acc is larger, or to set the target voltage VH* of the high voltage-side electric power line 54a to a voltage that tends to decrease more as the accelerator operation amount Acc is larger.

Although the hybrid vehicle 20 of the embodiment includes the step up-down converter 55, the hybrid vehicle 20 may not include the step up-down converter 55.

Although the hybrid vehicle 20 of the embodiment uses the battery 50 as an electric storage device, any device, such as a capacitor, may be used as long as the device can store electric power.

Although the hybrid vehicle 20 of the embodiment includes the engine ECU 24, the motor ECU 40, the battery ECU 52, and the HVECU 70, at least two of the ECUs may be configured as a single electronic control unit.

A description is given of a correspondence relation between main elements of the embodiments and main elements of the present disclosure described in SUMMARY. In the embodiments, the engine 22 corresponds to "engine", the first motor MG1 corresponds to "first motor", the planetary gear set 30 corresponds to "planetary gear set", the second motor MG2 corresponds to "second motor", the first inverter 41 corresponds to "first inverter", the second inverter 42 corresponds to "second inverter", the battery 50 corresponds to "electric storage device", and the HVECU 70, the engine ECU 24, and the motor ECU 40 correspond to "electronic control units."

Since the correspondence relation between the main elements of the embodiments and the main elements of the present disclosure described in SUMMARY is one example to provide a specific description of the modes for carrying out the present disclosure described in SUMMARY, the correspondence relation is not intended to limit the elements of the disclosure described in. More specifically, the disclosure disclosed in SUMMARY should be interpreted based on the description therein, and the embodiments are merely specific examples of the disclosure disclosed in SUMMARY.

Although the modes for carrying out the present disclosure have been described using the embodiments, the present disclosure is not limited in any manner to the embodiments disclosed. It should naturally be understood that the present disclosure can be carried out in various modes without departing from the scope of the present disclosure.

The present disclosure is applicable in fields such as manufacturing of hybrid vehicles.

What is claimed is:

1. A hybrid vehicle, comprising:
   an engine;
   a first motor configured to generate a counter-electromotive voltage with rotation of the first motor;
   a second motor connected to a driving shaft coupled with driving wheels of the hybrid vehicle;
   a planetary gear set having a sun gear connected to a rotator of the first motor, a ring gear connected to the driving shaft, and a carrier connected to a crankshaft of the engine;
   a first inverter configured to drive the first motor;
   a second inverter configured to drive the second motor;
   an electric storage device connected to the first inverter and the second inverter through an electric power line;

an electronic control unit configured to:
(i) control the engine such that the first motor rotates at a rotational speed that causes the counter-electromotive voltage of the first motor to be higher than direct current-side voltages of the first inverter and the second inverter, and the first motor outputs torque to the driving shaft through the planetary gear set, when an accelerator is on during specified traveling with gates of the first inverter and the second inverter being cut off and the engine being operated; and
(ii) keep the gates of the first inverter and the second inverter cut off and stop fuel injection of the engine, when the accelerator is turned off during the specified traveling with the gates of the first inverter and the second inverter being cut off and the engine being operated.

2. The hybrid vehicle according to claim 1, wherein the electronic control unit is configured to resume the fuel injection of the engine when the rotational speed of the engine reaches a specified rotational speed or lower than the specified rotational speed, after the accelerator is turned off during the specified traveling and the fuel injection of the engine is stopped.

3. The hybrid vehicle according to claim 1, wherein the electronic control unit is configured to resume fuel injection of the engine when the accelerator is turned on, after the accelerator is turned off and the fuel injection of the engine is stopped during the specified traveling.

4. The hybrid vehicle according to claim 1, wherein the electronic control unit is further configured to stop fuel injection of the engine, when the accelerator is turned off during the specified traveling with the gates of the first inverter and the second inverter being cut off and the engine being operated, when an engine rotational speed is larger than a specified rotational speed Neset which is larger by 200 rpm to 400 rpm than an allowable lower limit rotational speed Nemin of the engine.

5. A control method for a hybrid vehicle, the hybrid vehicle including: an engine, a first motor configured to generate a counter-electromotive voltage with rotation of the first motor, a second motor connected to a driving shaft coupled with driving wheels of the hybrid vehicle, a planetary gear set having a sun gear connected to a rotator of the first motor, a ring gear connected to the driving shaft, and a carrier connected to a crankshaft of the engine; a first inverter configured to drive the first motor; and a second inverter configured to drive the second motor, the control method comprising:
(i) controlling the engine such that the first motor rotates at a rotational speed that causes the counter-electromotive voltage of the first motor to be higher than direct current-side voltages of the first inverter and the second inverter, and the first motor outputs torque to the driving shaft through the planetary gear set, when an accelerator is on during specified traveling with gates of the first inverter and the second inverter being cut off and the engine being operated; and
(ii) keep the gates of the first inverter and the second inverter cut off and stop fuel injection of the engine, when the accelerator is turned off during the specified traveling with the gates of the first inverter and the second inverter being cut off and the engine being operated.

* * * * *